(12) United States Patent
Tsuji et al.

(10) Patent No.: US 7,676,683 B2
(45) Date of Patent: Mar. 9, 2010

(54) METHOD AND SYSTEM FOR REBOOTING A PROCESSOR IN A MULTI-PROCESSOR SYSTEM

(75) Inventors: Atsushi Tsuji, Kanagawa (JP); Chiaki Takano, Austin, TX (US); Atsuo Mangyo, San Jose, CA (US); Masaaki Nozaki, Kanagawa (JP); Shunsaku Tokito, Austin, TX (US); Hiroaki Terakawa, Austin, TX (US)

(73) Assignee: Sony Computer Entertainment Inc., Tokyo (JP)

( * ) Notice: Subject to any disclaimer, the term of this patent is extended or adjusted under 35 U.S.C. 154(b) by 696 days.

(21) Appl. No.: 11/509,493

(22) Filed: Aug. 24, 2006

(65) Prior Publication Data

US 2008/0052504 A1 Feb. 28, 2008

(51) Int. Cl.
G06F 1/00 (2006.01)
G06F 9/00 (2006.01)
G06F 13/00 (2006.01)
G06F 12/00 (2006.01)

(52) U.S. Cl. .................. 713/323; 713/1; 713/300; 710/104; 710/242

(58) Field of Classification Search .............. 713/1, 713/300, 323; 710/104, 242
See application file for complete search history.

(56) References Cited

U.S. PATENT DOCUMENTS

| | | | | |
|---|---|---|---|---|
| 4,870,570 A | * | 9/1989 | Satoh et al. | 713/320 |
| 5,349,664 A | * | 9/1994 | Ikeda et al. | 713/2 |
| 6,501,999 B1 | * | 12/2002 | Cai | 700/82 |
| 6,526,491 B2 | | 2/2003 | Suzuoki et al. | |
| 7,162,279 B2 | * | 1/2007 | Gupta | 455/574 |
| 7,305,569 B2 | * | 12/2007 | Reilly | 713/300 |
| 2002/0095609 A1 | * | 7/2002 | Tokunaga | 713/300 |
| 2006/0064575 A1 | * | 3/2006 | Jo | 713/2 |
| 2006/0206729 A1 | * | 9/2006 | Hentschel et al. | 713/300 |

* cited by examiner

*Primary Examiner*—Mark Connolly
*Assistant Examiner*—Stefan Stoynov
(74) *Attorney, Agent, or Firm*—Matthew B. Dernier, Esq.; Gibson & Dernier LLP

(57) ABSTRACT

Processors arranged in a multi-processor configuration for substantially parallel operations receive their initialization data in order to start operations, such as graphics computations, real-time multimedia streaming, etc. Due to a change in the processing load, one or more processors might be deactivated. Subsequently, the load increases to such a level that requires all or some of the deactivated processors to be active again. In this case, the boot-up process of the entire system is not carried out as it would be time-consuming and wasteful; instead, responsive to a control signal only those processors that were previously in inactive mode are re-initialized by selecting a configuration data supplied by another processor, controller or any other intelligent programmable device. Alternatively, the configuration data may be accessed and retrieved from a local storage medium individually located in each processor, thereby re-booting only those inactive processors and without re-initializing the entire system.

16 Claims, 8 Drawing Sheets

METHOD AND SYSTEM FOR REBOOTING A PROCESSOR IN A MULTI-PROCESSOR SYSTEM

BACKGROUND OF THE INVENTION

The present invention relates to a method and system for selectively rebooting a processor in a multi-processing system. More particularly, the present invention relates to a method and system for selectively activating a processor, previously placed into an inactive state, in a multi-processing system.

In recent years, there has been an insatiable desire for faster computer processing data throughputs because cutting-edge computer applications are becoming more and more complex, and are placing ever increasing demands on processing systems. Graphics applications are among those that place the highest demands on a processing system because they require such vast number of data accesses, data computations, and data manipulations in relatively short periods of time to achieve desirable visual results. Real-time, multimedia applications also place a high demand on processing systems; indeed, they require extremely fast processing speeds, such as many thousands of megabits of data per second.

While some processing systems employ a single processor to achieve fast processing speeds, others are implemented utilizing multi-processor architectures. In such multi-processor systems, a plurality of sub-processors or processing elements operate in parallel (or at least in concert) to achieve desired processing results.

Further in such a multi-processing or parallel processing system, each individual processor is initialized or booted up on power-up. Among other things, the initialization process includes the setting, re-setting and/or initialization of registers, mapping of memory space, allocation of various system resources, etc.

At certain point in time of system operation, it may become advantageous to re-allocate the hardware resources, re-map memory space, and perform other changes to the system configuration via software implementation in order to achieve an efficient and optimum system performance. For example, an additional and unexpected demand on the multi-processing system may require activating a processor, currently being in inactive state, to enhance the overall system processing power. The system is rebooted or re-initialized in order for the change to take effect and have system operate in a newly desired configuration.

A need, therefore, arises for a method and system that addresses the above issues by selectively activating a processor, previously placed into an inactive state, in a multi-processing system in a resource and time efficient manner.

SUMMARY OF THE INVENTION

The above need is met by a system and method for performing a multi-processing operation. In accordance with one aspect of the present invention, the system and method includes a first processor for performing a first operation, and a second processor, communicatively coupled to the first processor, for performing a second operation substantially in parallel with the first processor. Further included in the inventive system and method is initialization data which is operative to carry out an initial power-up procedure for the first and second processors. Additionally included is a storage medium, communicatively coupled to the first and second processors, for storing status data which is operative to have one of processors selectively switch from an active mode to an inactive mode after the initial power-up procedure.

In accordance with another aspect of the present invention, the initialization data is selected for one of the processors being switched from the inactive mode to the active mode, such that the other processor need not be re-initialized and remains operative uninterrupted.

BRIEF DESCRIPTION OF THE DRAWINGS

The present invention is illustrated in the figures of the accompanying drawings which are meant to be exemplary and not limiting, and in which like reference characters are intended to refer to like or corresponding parts.

DETAILED DESCRIPTION OF THE PREFERRED EMBODIMENTS

As a general overview, the present invention comprises a number of processors arranged in a multi-processor configuration for substantially parallel operations. Among other things, each processor includes circuit logic to fetch, decode, and execute instructions and a local memory for storing binary code and data associated with the code. When the processors are initially powered up, configuration or initialization data is provided to each individual processor in serial or parallel fashion. Namely, each processor receives its data in order to start an operation—to perform such functions as graphics computations, real-time multimedia streaming, etc. As the processing load changes in the multi-processing configuration based on various factors, one or more processors might be deactivated in response to a decreased load. Subsequently, the load increases to such a level that requires all or some of the deactivated processors to be active again. In this case, the boot-up process of the entire system is not carried out as it would be time-consuming and wasteful; instead, responsive to a control signal only those processors that were previously in inactive mode are re-initialized by selecting a configuration data supplied by another processor, controller or any other intelligent programmable device. Alternatively, the configuration data may be accessed and retrieved from a local storage medium individually located in each processor, another specialized memory, etc., thereby re-booting only those inactive processors and without re-initializing the entire system.

Figure 1:
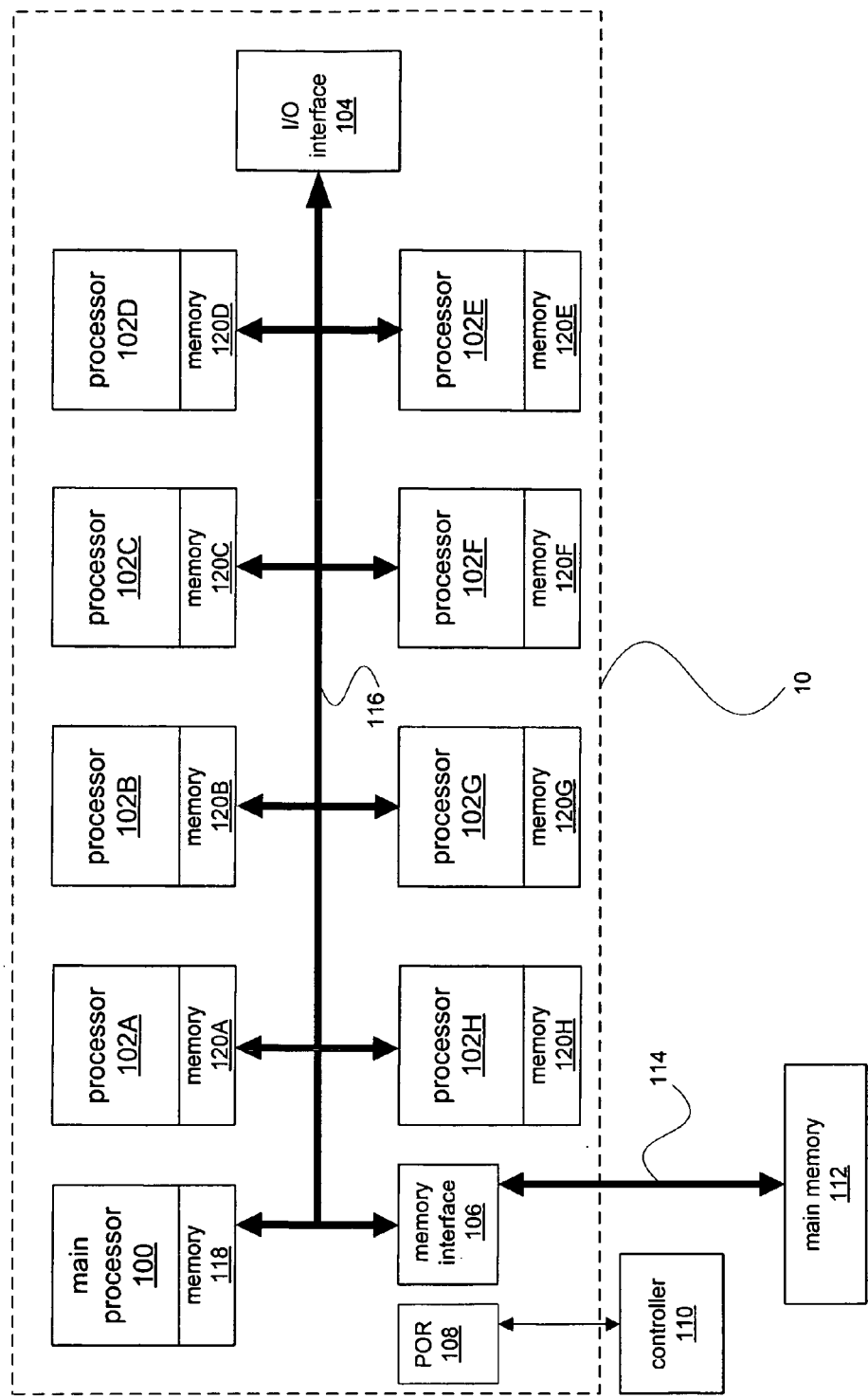
FIG. 1 is a block diagram of multi-processing system 10 currently in use.

Proceeding now to a detailed description of the invention with reference to figures herein, FIG. 1 is a block diagram of multi-processing system 10 currently in use. Multi-processing system 10 includes main processor 100, which is a standard full-instruction set processor for fetching, decoding and executing instructions. Among other things, main processor 100 schedules and manages the parallel connected processors, and performs other "housekeeping" functions in the system. Main processor 100 comprises memory 118, which is a locally accessible storage for storing data and program code that may be micro-coded and/or assembled, compiled or interpreted from various high-level or low-level languages. Multi-processing system 10 also includes processors 102A-102H, which are reduced instruction set computers (RISC) for processing various applications data (graphics, multimedia, telecommunications, etc.) substantially in parallel and independent of each other. Each of these RISC processors 102A-102H comprises, among other things, local memory 120A-120H, respectively, which represents a locally accessible storage for storing data and program code unique to that particular processor.

Further included in system 10 is Input/Output (I/O) interface 104 for inputting and outputting data from/to various circuits and/or peripheral devices. System 10 also comprises memory interface 106 for managing access to data residing in main or shared memory, such data being requested by main processor 100 and/or processors 102A-102H. The system 10 also includes a main power-on-reset (POR) unit 108 for receiving and sending configuration data and a controller 110 which may be integral or separate from the POR 108 and operable to manage obtaining and transmitting configuration data. Internal bus 116, further comprised in system 10, carries data and program code among main processor 100, processors 102A-102H, I/O interface 104, and memory interface 106, thereby providing a communications path among those elements.

Further illustrated in FIG. 1 is main memory 112. As stated hereinabove, main memory 112 is an external shared memory for storing data and program code associated with various applications. In alternative embodiments, main memory 112 may be integrally disposed on-chip with processors 102A-102H. Portions of such data and program code are typically swapped into and out of local memories of processors during their fetch, decode and/or execution cycles. Access to the data and program code residing in main memory 112 is managed by memory interface 106.

In operation, still referring to FIG. 1, controller 110 accesses configuration data in, for example, the POR 108 (or one of the local memories 120, or other specialized memory etc.) and provides this data to main POR unit 108. Main POR unit 108 then sends the so-called power-on-reset (POR) bit sequence to processors 102A-102H for their initialization during an initial power-up action. Included in this initialization or booting up process are such actions, pertaining to processors 102A-102H, as activation of processors, initial value setup for registers, reset of other registers, allocation of memory, etc. At some point in time, a processing load may drop thereby obviating the need for processors 102C and 102E to be active, for example, and the remaining processors having sufficient capacity to handle the reduced load. As currently in use, in order to deactivate processors 102C and 102E, the POR bit sequence is issued to and processed by all processors 102A-102H. In particular, controller 110 fetches the configuration data from the appropriate memory (such as that within POR 108 or other available memory). Main POR unit 108 then sends the POR bit sequence to processors 102A-102H via bus 116. Each processor then receives the POR bit sequence and responds accordingly. This process is usually carried out in a round-robin or ring bus arrangement. It is apparent, however, that even those processors that need not be deactivated have to stop, reboot and then restart its processing. Obviously, processors 102C and 102E are deactivated or turned off in response to the POR bit sequence.

Similarly, when processors 102C and 102E have to be turned back on due to an increased load, the POR bit sequence is again issued to and acted upon by all processors 102A-102H. Once again, those active processors currently in use have to stop and re-start their operations in response to the issued POR bit sequence.

Figure 2:
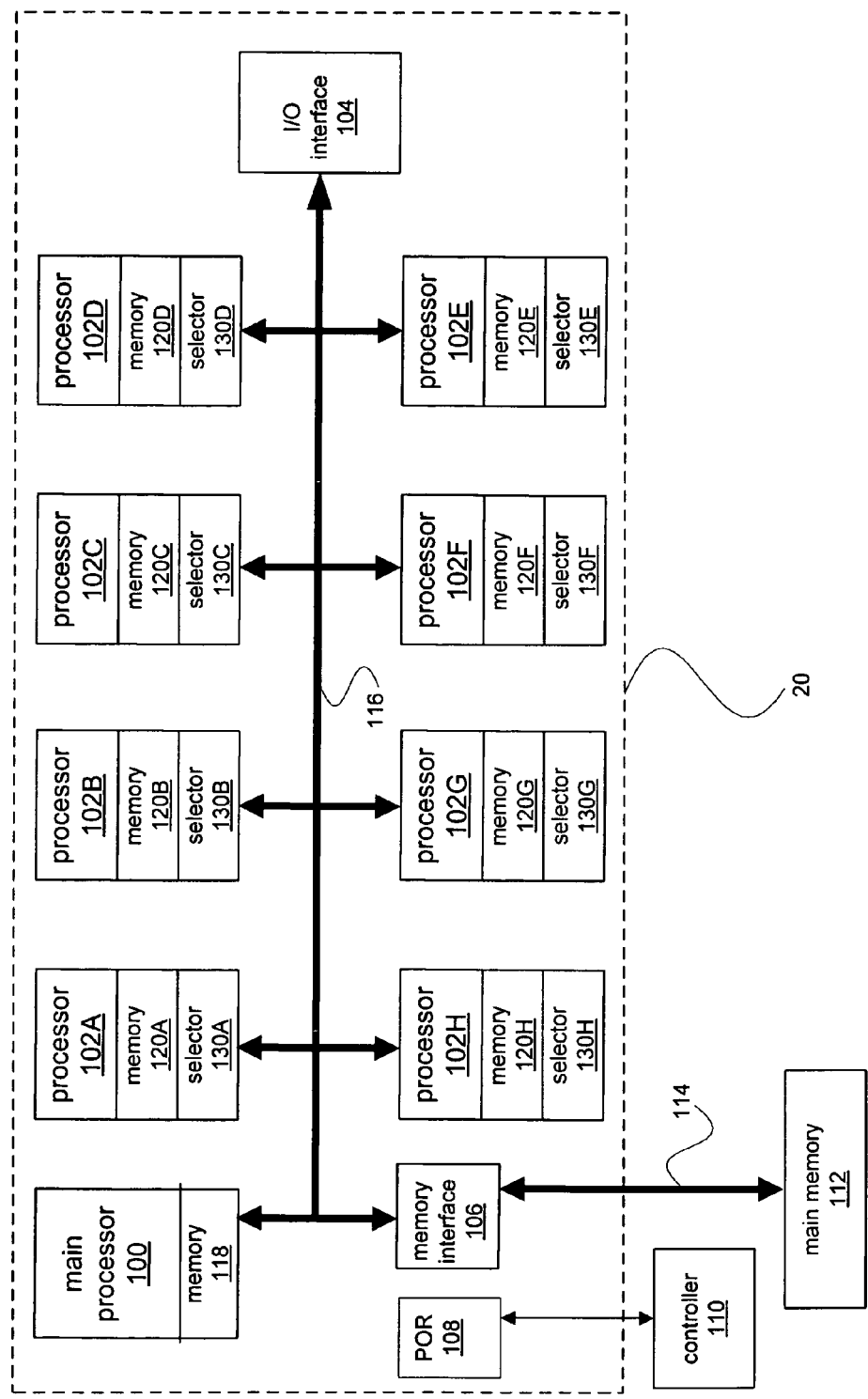
FIG. 2 is a block diagram of a preferred embodiment of the present invention.

Referring now to FIG. 2, a preferred embodiment of the present invention is shown therein. In particular, system 20 includes components which are substantially identical to those in system 10 of FIG. 1, with the exception that processors 102A-102H comprise selector units 130A-130H, respectively. In order to avoid repeating the description and eliminate redundant information, main processor 100, memory 118, memory interface 106, main POR unit 108, I/O interface 104, controller 110 and main memory 112 are substantially identical to their respective counterparts of FIG. 1, and their structural description will, therefore, be omitted with reference to FIG. 2.

As mentioned above, processors 102A-102H include selector units 130A-130H, respectively, for deciding whether to select the POR bit sequence needed by each individual processor in order to carry out a rebooting operation or, alternatively, not to select the POR bit sequence and simply pass it through to the next processor.

In operation, with reference to FIG. 2, controller 110 accesses configuration data in memory and provides this data to main POR unit 108. Main POR unit 108 then sends the POR bit sequence to processors 102A-102H for their initialization during a power-up (initial or otherwise). Prior to processing the POR bit sequence, selector units 130A-130H determine whether each corresponding processor should process the initialization data and boot up or, alternatively, ignore it and pass the data to the next processor in a sequential manner.

During the initial power-up of the system, each selector unit 130A-130H provides the POR bit sequence to its corresponding processor for initialization. Consequently, each processor receives the information necessary to power up, setup registers with initial values, reset registers, allocate memory, etc.

As an example, a processing load may drop subsequently, thereby obviating the need for one processor, such as processor 102C for instance, to be active and the remaining processors having sufficient capacity to handle the reduced load. Main processor 100 writes to memory interface 106 in order to deactivate processor 102C. For example, one or more registers (not shown) in POR 108 is assigned to store bits representing the active/inactive status of processors 102A-102H. Preferably, the registers are memory management input output (MMIO) registers. Hence, main processor 100 writes bit value(s) into this register (or registers) such that one or more bits correspond to the active/inactive status of each individual processor 102A-102H. The contents of this register are then provided to each processor 102A-102H via a predetermined polling sequence, through a request for interrupt by main processor 100, or any other process known to those skilled in the art.

In accordance with the above example, processor 102C determines that the register status bit or bits corresponding to its operation have been altered in order to indicate a request for change. A control signal is then supplied to processor 102C in order to turn off its power and/or disable its clock. As the result, processor 102C is deactivated without rebooting all other processors.

Figure 3:
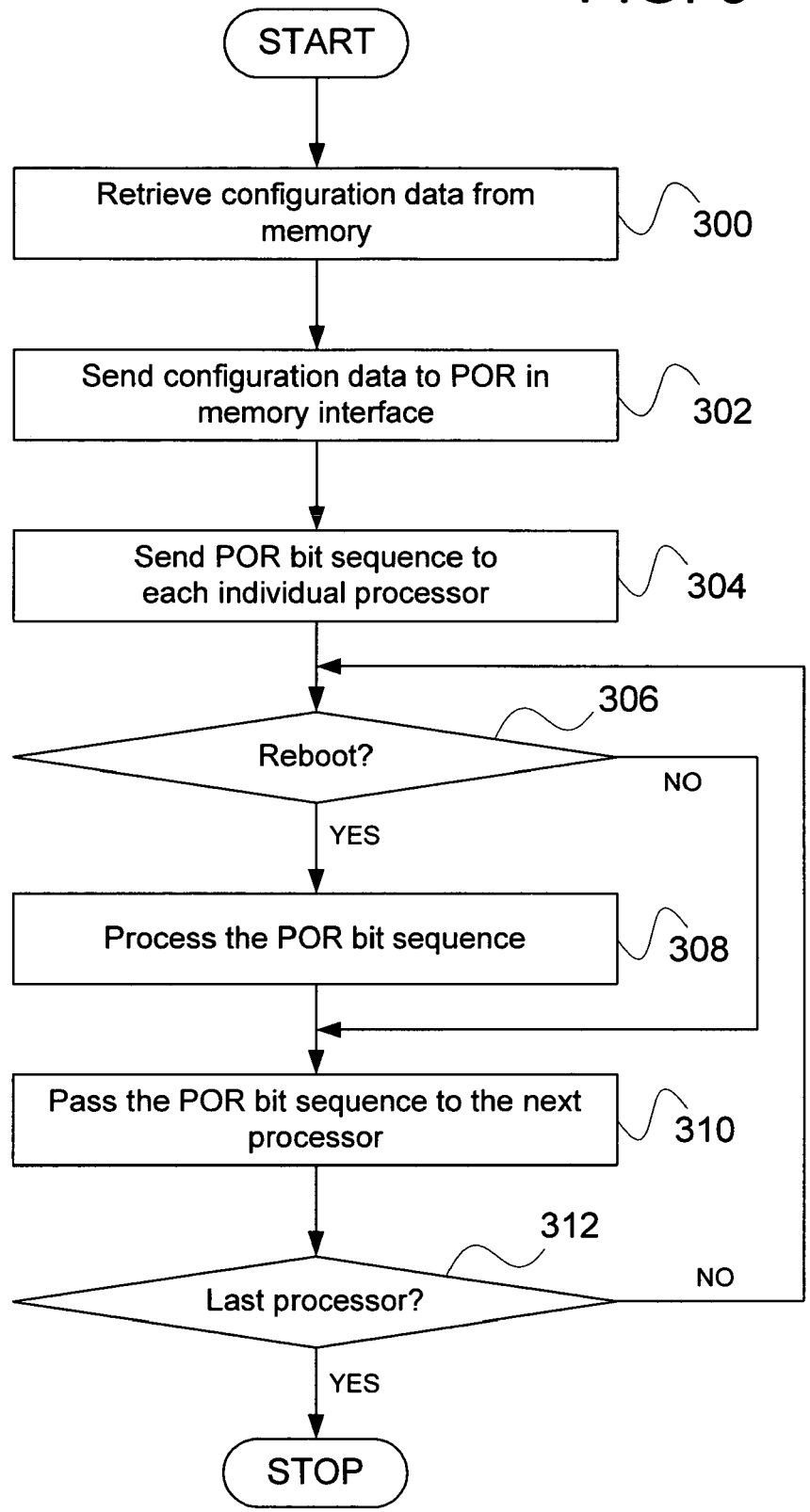
FIG. 3 is a flow diagram representing actions during the subsequent return of illustrative processor 102C to an active mode with reference to FIG. 2.

With reference to FIG. 3 as supplemented by FIG. 2, a flow diagram represents actions during the subsequent return of processor 102C to an active mode. In block 300, configuration data is retrieved from memory by controller 110. In block 302, the retrieved configuration data is sent (or made available) to main POR unit 108 in memory interface 106. Main POR unit 108 then outputs a POR bit sequence onto bus 116 for each individual processor 102A-102H, as shown in block 304. In block 306, each selector unit 130A-130H decides whether to accept the POR bit sequence for processing or, in the alternative, merely transfer it to the next processor. In this case, processor 102C receives a control signal, based on one or more bits in the status register of memory interface 106 as described above, to resume its operation. Therefore, selector unit 130C accepts data, i.e., the POR bit sequence, for processing by processor 102C in order to carry out its reboot operation. Following its boot-up procedure, processor 102C conveys the POR bit sequence to the next processor in a predetermined order.

Continuing with FIG. 3, based on a decision in block 306, other processors such as 102A, 102B, 102D, 102E, 102F, 102G and 102H bypass actions in block 308 and simply continue with transferring the POR bit sequence to the next processor, as shown in block 310. In block 312, a decision is made whether the last processor in the system has received the POR bit sequence for decision-making by its corresponding selector unit. If the answer is affirmative, the process stops; otherwise, the sequence continues with actions in block 306 for the next processor.

It will be appreciated that while in the above illustrative description controller 110 retrieves configuration data from, for example a memory within the POR 108 or other special memory, other options for supplying this data to memory interface 106 are possible. For example, main processor 100 or one of the processors 102A-102H may provide the configuration data memory interface 106 and, in particular, main POR unit 108. Alternatively, memory interface 106 or main POR unit 108 may store configuration data in its local memory (now shown) at the initial power-up operation. In this case, the stored data is provided to the processors on an as-needed basis directly from the local memory. While it is a less likely implementation, some embodiments may employ the main memory 112 to store the configuration data.

It will be further appreciated that while FIG. 3 shows the transfer of the POR bit sequence from one processor to another sequentially in a descending order, the order need not be such. Any predetermined order may be used in such transfers.

Figure 4:
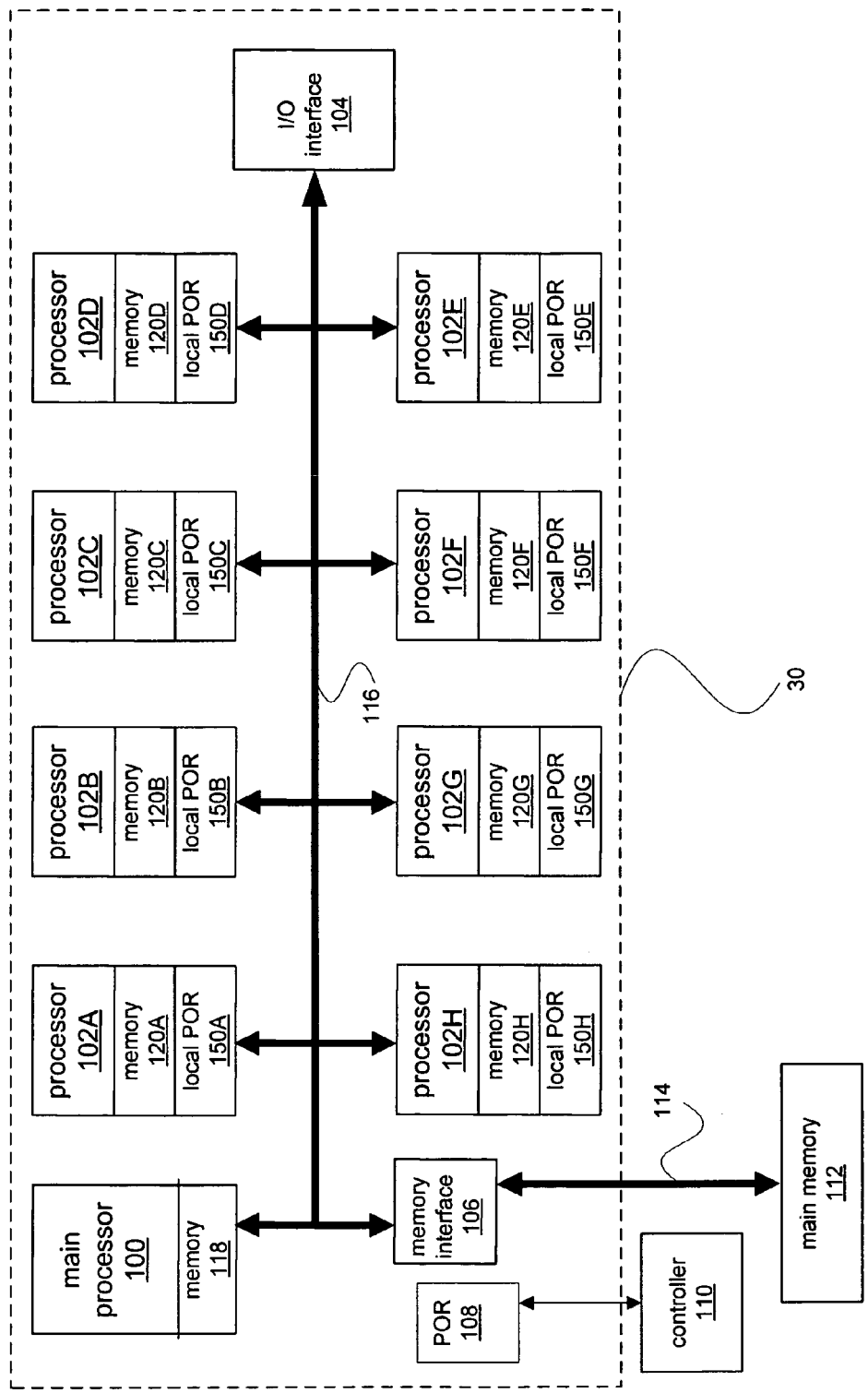
FIG. 4 is a block diagram illustrating another embodiment of the present invention.

Reference is now made to FIG. 4, illustrating another embodiment of the present invention. In particular, system 30 includes components which are substantially identical to those in system 10 of FIG. 1, with the exception that processors 102A-102H additionally comprise local POR units 150A-150H, respectively. In order to avoid repeating the description and eliminate redundant information, main processor 100, memory 118, memory interface 106, main POR unit 108, I/O interface 104, controller 110 and main memory 112 are substantially identical to their respective counterparts of FIG. 1, and their structural description will, therefore, be omitted with reference to FIG. 4.

In particular, processors 102A-102H include local POR units 150A-150H, respectively, for storing the entire or partial POR bit sequence needed by each individual processor for a rebooting operation.

In operation, with reference to FIG. 4, controller 110 accesses configuration data in memory and provides it to main POR unit 108. Main POR unit 108 then sends the POR bit sequence to processors 102A-102H for their initialization during a power-up (initial or otherwise). The full or partial POR bit sequence is stored in local POR units 150A-150H for the initial power-up and a selective rebooting procedure of their respective processors following the initial power-up.

During the initial power-up of the system, each local POR unit 150A-150H provides the POR bit sequence to its corresponding processor for initialization after storing the sequence in each local POR unit's memory (not shown), for example. Consequently, each processor receives and executes instructions to power up, setup registers with initial values, reset registers, allocate memory, etc.

Subsequently, a processing load may drop, thereby obviating the need for processor 102C to be active, for instance, and the remaining processors having sufficient capacity to handle the reduced load. Main processor 100 then writes to memory interface 106 in order to deactivate processor 102C. For example, a register (not shown) in memory interface 106 is assigned to store bits representing the active/inactive status of processors 102A-102H. Hence, main processor 100 writes a bit value into this register such that one or more bits correspond to each individual processor 102A-102H. The contents of this register are then provided to each processor 102A-102H via a predetermined polling sequence, through a request for interrupt by main processor 100, or any other process known to those skilled in the art.

In accordance with the above example, processor 102C determines that the register status bit or bits corresponding to its operation have been altered in such a way as to indicate a request for change. A control signal is then supplied to processor 102C in order to disable its clock. As the result, processor 102C is deactivated without rebooting all other processors.

Figure 5:
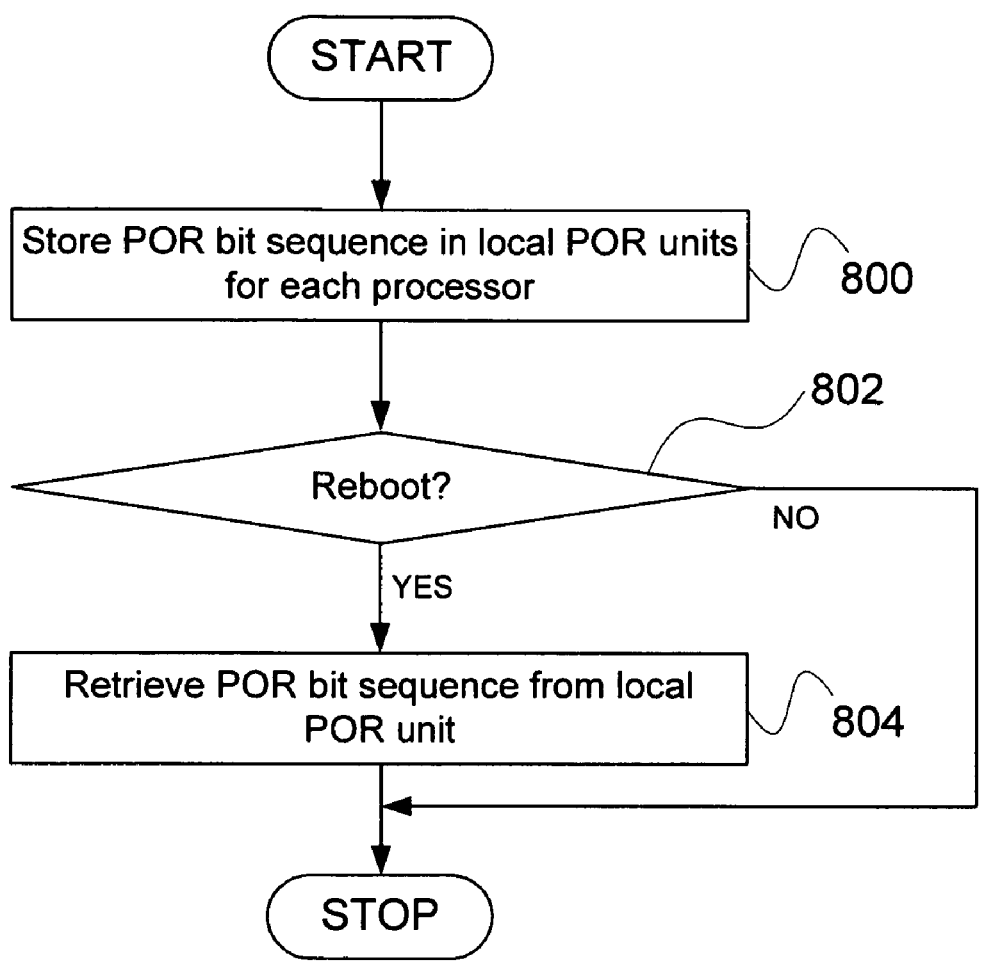
FIG. 5 is a flow diagram representing actions during the subsequent return of illustrative processor 102C to its active mode with reference to FIG. 4.

With reference to FIG. 5 as supplemented by FIG. 4, a flow diagram represents actions during the subsequent return of processor 102C to its active mode. In block 800, a POR bit sequence is stored in each local POR unit 150A-150H. For example, this sequence may be stored in local memories 120A-120H or, in the alternative, in local storage (register, etc., not shown in the figure) specifically designated for such use and associated with the corresponding local POR unit. In block 802, a decision is made whether to reboot. In particular, processor 102C or local POR unit 150C receives a control signal, based on one or more bits in the status register of memory interface 106 as described above, to resume its operation. Consequently, local POR unit 150C retrieves the POR bit sequence from its local storage in order to reboot processor 102C, as shown in block 804. Based on a decision in block 802, other processors, such as 102A, 102B, 102D, 102E, 102F, 102G and 102H, continue their operations uninterrupted, because the control signal has not been received for their re-initialization.

With reference to all embodiments of the present invention, it will be appreciated that during the described selective, dynamic rebooting operation, no other processors were affected in the process, thereby eliminating performance degradation of the overall system.

It will be further appreciated that local memories 120A-120H may be disposed on or off a chip on which the corresponding processors 102A-102H are located. Local memories 120A-120H may or may not be a part of the overall physical or virtual structure of the corresponding processors 102A-102H.

Similarly, it will be appreciated that selector units 130A-130H may be disposed on or off a chip on which the corresponding processors 102A-102H are located. These selector units may or may not be a part of the overall physical or virtual structure of the corresponding processors 102A-102H.

It will be further appreciated that local POR units 150A-150H may be disposed on or off a chip on which the corresponding processors 102A-102H are located. These local POR units may or may not be a part of the overall physical or virtual structure of the corresponding processors 102A-102H.

Additionally, it will be appreciated that main POR 108 may be disposed on or off a chip on which memory interface 106 is located. This main POR unit may or may not be a part of the overall physical or virtual structure of memory interface 106.

A description of computer architecture for a multi-processor system will now be provided that is suitable for carrying out one or more of the features discussed herein. In accordance with one or more embodiments, the multi-processor system may be implemented as a single-chip solution operable for stand-alone and/or distributed processing of media-rich applications, such as game systems, home terminals, PC systems, server systems and workstations. In some applications, such as game systems and home terminals, real-time computing may be a necessity. For example, in a real-time, distributed gaming application, one or more of networking image decompression, 3D computer graphics, audio generation, network communications, physical simulation, and artificial intelligence processes have to be executed quickly enough to provide the user with the illusion of a real-time experience. Thus, each processor in the multi-processor system must complete tasks in a short and predictable time.

To this end, and in accordance with this computer architecture, all processors of a multi-processing computer system are constructed from a common computing module (or cell). This common computing module has a consistent structure and preferably employs the same instruction set architecture. The multi-processing computer system can be formed of one or more clients, servers, PCs, mobile computers, game machines, PDAs, set top boxes, appliances, digital televisions and other devices using computer processors.

A plurality of the computer systems may also be members of a network if desired. The consistent modular structure enables efficient, high speed processing of applications and data by the multi-processing computer system, and if a network is employed, the rapid transmission of applications and data over the network. This structure also simplifies the building of members of the network of various sizes and processing power and the preparation of applications for processing by these members.

Figure 6:
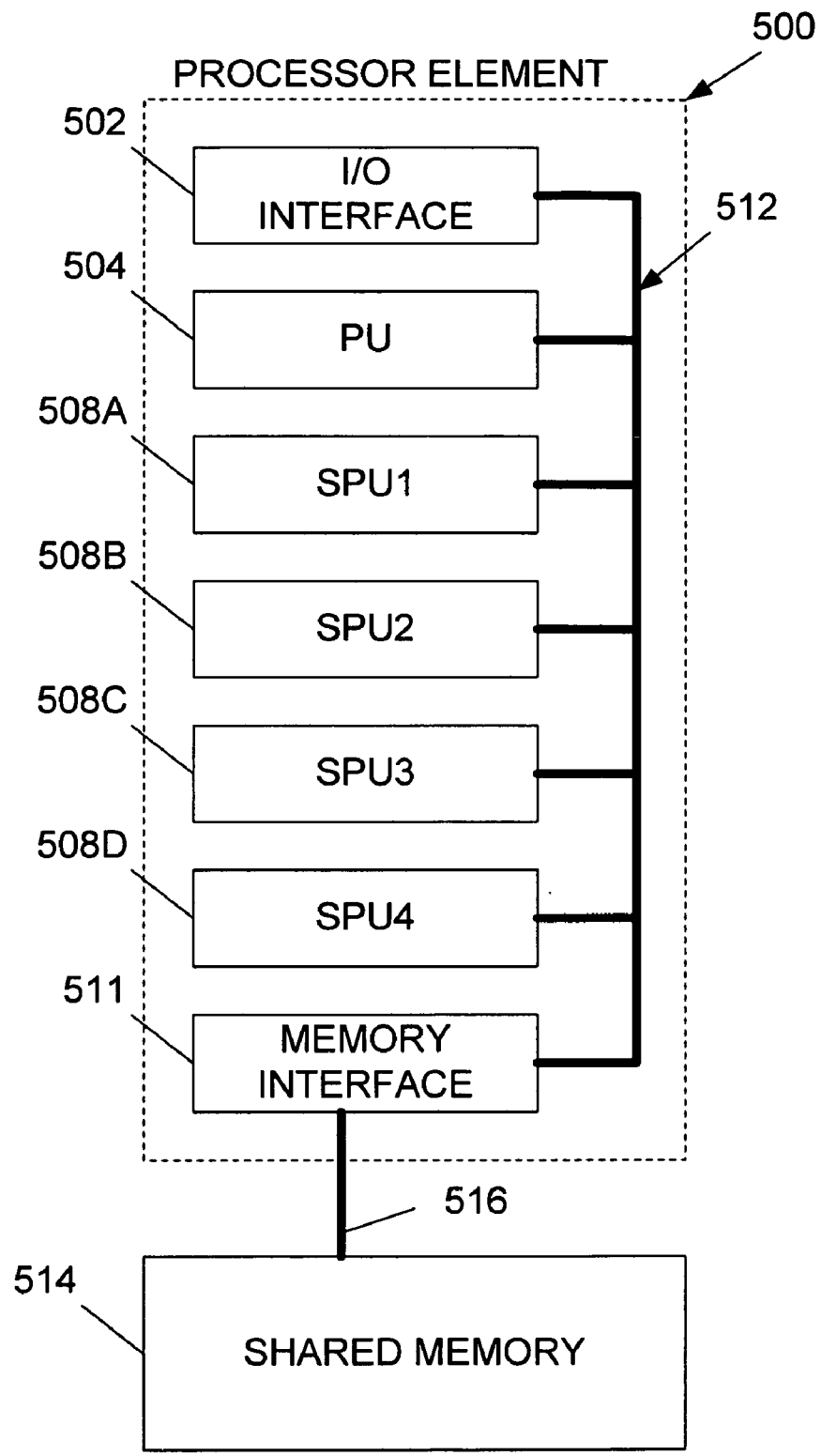
FIG. 6 is a block diagram illustrating a preferred processor element (PE) that may be used to implement one or more further aspects of the present invention.

With reference to FIG. 6, the basic processing module is a processor element (PE) 500. The PE 500 comprises an I/O interface 502, a processing unit (PU) 504, and a plurality of sub-processing units 508, namely, sub-processing unit 508A, sub-processing unit 508B, sub-processing unit 508C, and sub-processing unit 508D. A local (or internal) PE bus 512 transmits data and applications among the PU 504, the sub-processing units 508, and a memory interface 511. The local PE bus 512 can have, e.g., a conventional architecture or can be implemented as a packet-switched network. If implemented as a packet switch network, while requiring more hardware, increases the available bandwidth.

The PE 500 can be constructed using various methods for implementing digital logic. The PE 500 preferably is constructed, however, as a single integrated circuit employing a complementary metal oxide semiconductor (CMOS) on a silicon substrate. Alternative materials for substrates include gallium arsenide, gallium aluminum arsenide and other so-called III-B compounds employing a wide variety of dopants. The PE 500 also may be implemented using superconducting material, e.g., rapid single-flux-quantum (RSFQ) logic.

The PE 500 is closely associated with a shared (main) memory 514 through a high bandwidth memory connection 516. Although the memory 514 preferably is a dynamic random access memory (DRAM), the memory 514 could be implemented using other means, e.g., as a static random access memory (SRAM), a magnetic random access memory (MRAM), an optical memory, a holographic memory, etc.

The PU 504 and the sub-processing units 508 are preferably each coupled to a memory flow controller (MFC) including direct memory access DMA functionality, which in combination with the memory interface 511, facilitate the transfer of data between the DRAM 514 and the sub-processing units 508 and the PU 504 of the PE 500. It is noted that the DMAC and/or the memory interface 511 may be integrally or separately disposed with respect to the sub-processing units 508 and the PU 504. Indeed, the DMAC function and/or the memory interface 511 function may be integral with one or more (preferably all) of the sub-processing units 508 and the PU 504. It is also noted that the DRAM 514 may be integrally or separately disposed with respect to the PE 500. For example, the DRAM 514 may be disposed off-chip as is implied by the illustration shown or the DRAM 514 may be disposed on-chip in an integrated fashion.

The PU 504 can be, e.g., a standard processor capable of stand-alone processing of data and applications. In operation, the PU 504 preferably schedules and orchestrates the processing of data and applications by the sub-processing units. The sub-processing units preferably are single instruction, multiple data (SIMD) processors. Under the control of the PU 504, the sub-processing units perform the processing of these data and applications in a parallel and independent manner. The PU 504 is preferably implemented using a PowerPC core, which is a microprocessor architecture that employs reduced instruction-set computing (RISC) technique. RISC performs more complex instructions using combinations of simple instructions. Thus, the timing for the processor may be based on simpler and faster operations, enabling the microprocessor to perform more instructions for a given clock speed.

It is noted that the PU 504 may be implemented by one of the sub-processing units 508 taking on the role of a main processing unit that schedules and orchestrates the processing of data and applications by the sub-processing units 508. Further, there may be more than one PU implemented within the processor element 500.

In accordance with this modular structure, the number of PEs 500 employed by a particular computer system is based upon the processing power required by that system. For example, a server may employ four PEs 500, a workstation may employ two PEs 500 and a PDA may employ one PE 500. The number of sub-processing units of a PE 500 assigned to processing a particular software cell depends upon the complexity and magnitude of the programs and data within the cell.

Figure 7:
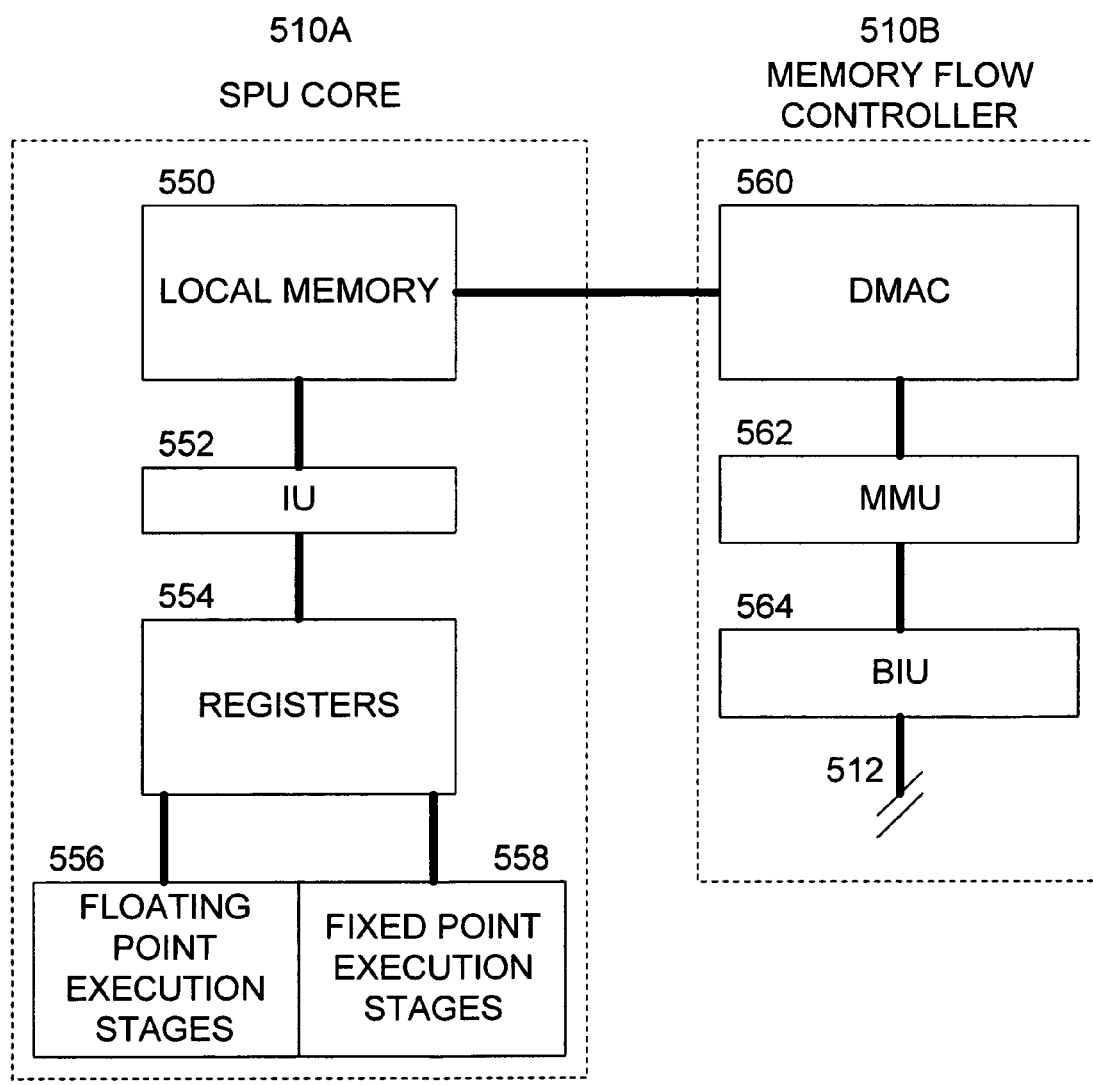
FIG. 7 is a block diagram illustrating the structure of an exemplary sub-processing unit (SPU) of the system of FIG. 6 that may be adapted in accordance with one or more further aspects of the present invention.

FIG. 7 illustrates the preferred structure and function of a sub-processing unit (SPU) 508. The SPU 508 architecture preferably fills a void between general-purpose processors (which are designed to achieve high average performance on a broad set of applications) and special-purpose processors (which are designed to achieve high performance on a single application). The SPU 508 is designed to achieve high performance on game applications, media applications, broadband systems, etc., and to provide a high degree of control to programmers of real-time applications. Some capabilities of the SPU 508 include graphics geometry pipelines, surface subdivision, Fast Fourier Transforms, image processing keywords, stream processing, MPEG encoding/decoding, encryption, decryption, device driver extensions, modeling, game physics, content creation, and audio synthesis and processing.

The sub-processing unit 508 includes two basic functional units, namely an SPU core 510A and a memory flow controller (MFC) 510B. The SPU core 510A performs program execution, data manipulation, etc., while the MFC 510B performs functions related to data transfers between the SPU core 510A and the DRAM 514 of the system.

The SPU core 510A includes a local memory 550, an instruction unit (IU) 552, registers 554, one or more floating point execution stages 556 and one or more fixed point execution stages 558. The local memory 550 is preferably implemented using single-ported random access memory, such as an SRAM. Whereas most processors reduce latency to memory by employing caches, the SPU core 510A implements the relatively small local memory 550 rather than a cache. Indeed, in order to provide consistent and predictable memory access latency for programmers of real-time applications (and other applications as mentioned herein) a cache memory architecture within the SPU 508A is not preferred. The cache hit/miss characteristics of a cache memory results in volatile memory access times, varying from a few cycles to a few hundred cycles. Such volatility undercuts the access timing predictability that is desirable in, for example, real-time application programming. Latency hiding may be achieved in the local memory SRAM 550 by overlapping DMA transfers with data computation. This provides a high degree of control for the programming of real-time applications. As the latency and instruction overhead associated with DMA transfers exceeds that of the latency of servicing a cache miss, the SRAM local memory approach achieves an advantage when the DMA transfer size is sufficiently large and is sufficiently predictable (e.g., a DMA command can be issued before data is needed).

A program running on a given one of the sub-processing units 508 references the associated local memory 550 using a local address, however, each location of the local memory 550 is also assigned a real address (RA) within the overall system's memory map. This allows Privilege Software to map a local memory 550 into the Effective Address (EA) of a process to facilitate DMA transfers between one local memory 550 and another local memory 550. The PU 504 can also directly access the local memory 550 using an effective address. In a preferred embodiment, the local memory 550 contains 556 kilobytes of storage, and the capacity of registers 552 is 128×128 bits.

The SPU core 504A is preferably implemented using a processing pipeline, in which logic instructions are processed in a pipelined fashion. Although the pipeline may be divided into any number of stages at which instructions are processed, the pipeline generally comprises fetching one or more instructions, decoding the instructions, checking for dependencies among the instructions, issuing the instructions, and executing the instructions. In this regard, the IU 552 includes an instruction buffer, instruction decode circuitry, dependency check circuitry, and instruction issue circuitry.

The instruction buffer preferably includes a plurality of registers that are coupled to the local memory 550 and operable to temporarily store instructions as they are fetched. The instruction buffer preferably operates such that all the instructions leave the registers as a group, i.e., substantially simultaneously. Although the instruction buffer may be of any size, it is preferred that it is of a size not larger than about two or three registers.

In general, the decode circuitry breaks down the instructions and generates logical micro-operations that perform the function of the corresponding instruction. For example, the logical micro-operations may specify arithmetic and logical operations, load and store operations to the local memory 550, register source operands and/or immediate data operands. The decode circuitry may also indicate which resources the instruction uses, such as target register addresses, structural resources, function units and/or busses. The decode circuitry may also supply information indicating the instruction pipeline stages in which the resources are required. The instruction decode circuitry is preferably operable to substantially simultaneously decode a number of instructions equal to the number of registers of the instruction buffer.

The dependency check circuitry includes digital logic that performs testing to determine whether the operands of given instruction are dependent on the operands of other instructions in the pipeline. If so, then the given instruction should not be executed until such other operands are updated (e.g., by permitting the other instructions to complete execution).

The instruction issue circuitry is operable to issue the instructions to the floating point execution stages 556 and/or the fixed point execution stages 558.

The registers 554 are preferably implemented as a relatively large unified register file, such as a 128-entry register file. This allows for deeply pipelined high-frequency implementations without requiring register renaming to avoid register starvation. Renaming hardware typically consumes a significant fraction of the area and power in a processing system. Consequently, advantageous operation may be achieved when latencies are covered by software loop unrolling or other interleaving techniques.

Preferably, the SPU core 510A is of a superscalar architecture, such that more than one instruction is issued per clock cycle. The SPU core 510A preferably operates as a superscalar to a degree corresponding to the number of simultaneous instruction dispatches from the instruction buffer, such as between 2 and 3 (meaning that two or three instructions are issued each clock cycle). Depending upon the required processing power, a greater or lesser number of floating point execution stages 556 and fixed point execution stages 558 may be employed. In a preferred embodiment, the floating point execution stages 556 operate at a speed of 32 billion floating point operations per second (32 GFLOPS), and the fixed point execution stages 558 operate at a speed of 32 billion operations per second (32 GOPS).

The MFC 510B preferably includes a bus interface unit (BIU) 564, a memory management unit (MMU) 562, and a direct memory access controller (DMAC) 560. With the exception of the DMAC 560, the MFC 510B preferably runs at half frequency (half speed) as compared with the SPU core 510A and the bus 512 to meet low power dissipation design objectives. The MFC 510B is operable to handle data and instructions coming into the SPU 508 from the bus 512, provides address translation for the DMAC, and snoop-operations for data coherency. The BIU 564 provides an interface between the bus 512 and the MMU 562 and DMAC 560. Thus, the SPU 508 (including the SPU core 510A and the MFC 510B) and the DMAC 560 are connected physically and/or logically to the bus 512.

The MMU 562 is preferably operable to translate effective addresses (taken from DMA commands) into real addresses for memory access. For example, the MMU 562 may translate the higher order bits of the effective address into real address bits. The lower-order address bits, however, are preferably untranslatable and are considered both logical and physical for use to form the real address and request access to memory. In one or more embodiments, the MMU 562 may be implemented based on a 64-bit memory management model, and may provide $2^{64}$ bytes of effective address space with 4K-, 64K-, 1M-, and 16M-byte page sizes and 256 MB segment sizes. Preferably, the MMU 562 is operable to support up to $2^{65}$ bytes of virtual memory, and $2^{42}$ bytes (4 TeraBytes) of physical memory for DMA commands. The hardware of the MMU 562 may include an 8-entry, fully associative SLB, a 256-entry, 4-way set associative TLB, and a 4×4 Replacement Management Table (RMT) for the TLB—used for hardware TLB miss handling.

The DMAC 560 is preferably operable to manage DMA commands from the SPU core 510A and one or more other devices such as the PU 504 and/or the other SPUs. There may be three categories of DMA commands: Put commands, which operate to move data from the local memory 550 to the shared memory 514; Get commands, which operate to move data into the local memory 550 from the shared memory 514; and Storage Control commands, which include SLI commands and synchronization commands. The synchronization commands may include atomic commands, send signal commands, and dedicated barrier commands. In response to DMA commands, the MMU 562 translates the effective address into a real address and the real address is forwarded to the BIU 564.

The SPU core 510A preferably uses a channel interface and data interface to communicate (send DMA commands, status, etc.) with an interface within the DMAC 560. The SPU core 510A dispatches DMA commands through the channel interface to a DMA queue in the DMAC 560. Once a DMA command is in the DMA queue, it is handled by issue and completion logic within the DMAC 560. When all bus transactions for a DMA command are finished, a completion signal is sent back to the SPU core 510A over the channel interface.

Figure 8:
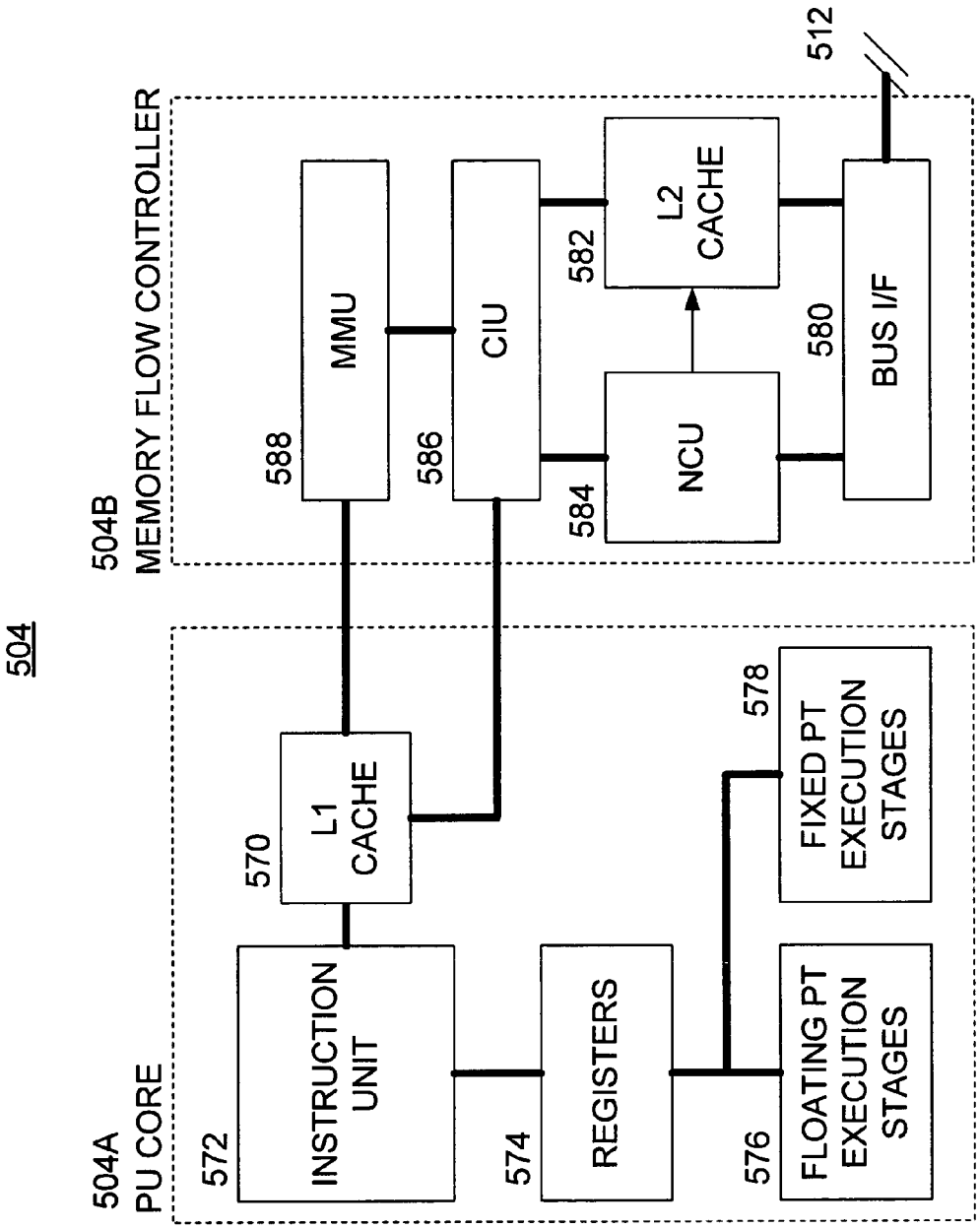
FIG. 8 is a block diagram illustrating the structure of an exemplary processing unit (PU) of the system of FIG. 6 that may be adapted in accordance with one or more further aspects of the present invention.

FIG. 8 illustrates the preferred structure and function of the PU 504. The PU 504 includes two basic functional units, the PU core 504A and the memory flow controller (MFC) 504B. The PU core 504A performs program execution, data manipulation, multi-processor management functions, etc., while the MFC 504B performs functions related to data transfers between the PU core 504A and the memory space.

The PU core 504A may include an L1 cache 570, an instruction unit 572, registers 574, one or more floating point execution stages 576 and one or more fixed point execution stages 578. The L1 cache provides data caching functionality for data received from the main memory, the processors, or other portions of the memory space through the MFC 504B. As the PU core 504A is preferably implemented as a super-pipeline, the instruction unit 572 is preferably implemented as an instruction pipeline with many stages, including fetching, decoding, dependency checking, issuing, etc. The PU core 504A is also preferably of a superscalar configuration, whereby more than one instruction is issued from the instruction unit 572 per clock cycle. To achieve a high processing power, the floating point execution stages 576 and the fixed point execution stages 578 include a plurality of stages in a pipeline configuration. Depending upon the required processing power, a greater or lesser number of floating point execution stages 576 and fixed point execution stages 578 may be employed.

The MFC 504B includes a bus interface unit (BIU) 580, an L2 cache memory, a non-cachable unit (NCU) 584, a core interface unit (CIU) 586, and a memory management unit (MMU) 588. Most of the MFC 504B runs at half frequency (half speed) as compared with the PU core 504A to meet low power dissipation design objectives.

The BIU 580 provides an interface between the bus and the L2 cache 582 and NCU 584 logic blocks. To this end, the BIU 580 may act as a Master as well as a Slave device on the bus in order to perform fully coherent memory operations. As a Master device it may source load/store requests to the bus for service on behalf of the L2 cache 582 and the NCU 584. The BIU 580 may also implement a flow control mechanism for commands which limits the total number of commands that can be sent to the bus. The data operations on the bus may be designed to take eight beats and, therefore, the BIU 580 is preferably designed around 128 byte cache-lines and the coherency and synchronization granularity is 128 KB.

The L2 cache memory 582 (and supporting hardware logic) is preferably designed to cache 512 KB of data. For example, the L2 cache 582 may handle cacheable loads/stores, data pre-fetches, instruction fetches, instruction pre-fetches, cache operations, and barrier operations. The L2 cache 582 is preferably an 8-way set associative system. The L2 cache 582 may include six reload queues matching six (6) castout queues (e.g., six RC machines), and eight (64-byte wide) store queues. The L2 cache 582 may operate to provide a backup copy of some or all of the data in the L1 cache 570. Advantageously, this is useful in restoring state(s) when processing nodes are hot-swapped. This configuration also permits the L1 cache 570 to operate more quickly with fewer ports, and permits faster cache-to-cache transfers (because the requests may stop at the L2 cache 582). This configuration also provides a mechanism for passing cache coherency management to the L2 cache memory 582.

The NCU 584 interfaces with the CIU 586, the L2 cache memory 582, and the BIU 580 and generally functions as a queuing/buffering circuit for non-cacheable operations between the PU core 504A and the memory system. The NCU 584 preferably handles all communications with the PU core 504A that are not handled by the L2 cache 582, such as cache-inhibited load/stores, barrier operations, and cache coherency operations. The NCU 584 is preferably run at half speed to meet the aforementioned power dissipation objectives.

The CIU 586 is disposed on the boundary of the MFC 504B and the PU core 504A and acts as a routing, arbitration, and flow control point for requests coming from the execution stages 576, 578, the instruction unit 572, and the MMU unit 588 and going to the L2 cache 582 and the NCU 584. The PU core 504A and the MMU 588 preferably run at full speed, while the L2 cache 582 and the NCU 584 are operable for a 2:1 speed ratio. Thus, a frequency boundary exists in the CIU 586 and one of its functions is to properly handle the frequency crossing as it forwards requests and reloads data between the two frequency domains.

The CIU 586 is comprised of three functional blocks: a load unit, a store unit, and reload unit. In addition, a data pre-fetch function is performed by the CIU 586 and is preferably a functional part of the load unit. The CIU 586 is preferably operable to: (i) accept load and store requests from the PU core 504A and the MMU 588; (ii) convert the requests from full speed clock frequency to half speed (a 2:1 clock frequency conversion); (iii) route cachable requests to the L2 cache 582, and route non-cachable requests to the NCU 584; (iv) arbitrate fairly between the requests to the L2 cache 582 and the NCU 584; (v) provide flow control over the dispatch to the L2 cache 582 and the NCU 584 so that the requests are received in a target window and overflow is avoided; (vi) accept load return data and route it to the execution stages 576, 578, the instruction unit 572, or the MMU 588; (vii) pass snoop requests to the execution stages 576, 578, the instruction unit 572, or the MMU 588; and (viii) convert load return data and snoop traffic from half speed to full speed.

The MMU 588 preferably provides address translation for the PU core 540A, such as by way of a second level address translation facility. A first level of translation is preferably provided in the PU core 504A by separate instruction and data ERAT (effective to real address translation) arrays that may be much smaller and faster than the MMU 588.

In a preferred embodiment, the PU 504 operates at 4-6 GHz, 10F04, with a 64-bit implementation. The registers are preferably 64 bits long (although one or more special purpose registers may be smaller) and effective addresses are 64 bits long. The instruction unit 570, registers 572 and execution stages 574 and 576 are preferably implemented using PowerPC technology to achieve the (RISC) computing technique.

Additional details regarding the modular structure of this computer system may be found in U.S. Pat. No. 6,526,491, the entire disclosure of which is hereby incorporated by reference.

In accordance with at least one further aspect of the present invention, the methods and apparatus described above may be achieved utilizing suitable hardware, such as that illustrated in the figures. Such hardware may be implemented utilizing any of the known technologies, such as standard digital circuitry, any of the known processors that are operable to execute software and/or firmware programs, one or more programmable digital devices or systems, such as programmable read only memories (PROMs), programmable array logic devices (PALs), etc. Furthermore, although the apparatus illustrated in the figures are shown as being partitioned into certain functional blocks, such blocks may be implemented by way of separate circuitry and/or combined into one or more functional units. Still further, the various aspects of the invention may be implemented by way of software and/or firmware program(s) that may be stored on suitable storage medium or media (such as floppy disk(s), memory chip(s), etc.) for transportability and/or distribution.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A system for performing a multi-processing operation, comprising:
   a main processor operating to monitor a processing load of the system, and operating to selectively enable and disable one or more of a plurality of processors;
   a first processor of said plurality of processors operating to perform a first operation, said first processor including a first selector unit communicatively coupled thereto;
   a second processor of said plurality of processors, communicatively coupled to said first processor, operating to perform a second operation, said second processor including a second selector unit communicatively coupled thereto, said first and second processors receiving initialization data which carries out an initial power-up procedure; and
   a storage medium, communicatively coupled to said first and second processors, for storing status data from said main processor which has one of said first and second processors selectively switch from at least one of an active mode to an inactive mode after said initial power-up procedure and an inactive mode to an active mode after said initial power-up procedure, wherein:
   said initialization data is selected for one of said first and second processors being switched from at least one of said inactive mode to said active mode and said active mode to said inactive mode, such that the other of said first and second processors need not be re-initialized and remains operative uninterrupted;
   said first and second selector units receive said initialization data and decide whether to provide said initialization data to their respective processors for at least one of said initial power-up procedure and re-initialization; and
   at least one of said first processor and said second processor operates to process said received initialization data for at least one of said initial power-up procedure and said re-initialization when said system requires the use thereof to handle said processing load, and at least one of said first processor and said second processor operates to not process said received initialization data for at least one of said initial power-up procedure and said re-initialization when said system does not require the use thereof to handle said processing load.

2. The system according to claim 1, further comprising a main storage medium, communicatively coupled to said storage medium, for storing said initialization data.

3. The system according to claim 1, wherein said inactive mode comprises turning off power to said one processor, and said active mode comprises turning on the power to said one processor.

4. The system according to claim 1, wherein said inactive mode comprises disabling a clock signal to said one processor, and said active mode comprises enabling said clock signal to said one processor.

5. The system according to claim 1, wherein said storage medium includes a power-on-reset unit.

6. The system according to claim 1, wherein said first and second selector units decide whether to provide said initialization data to their respective processors for re-initialization in response to a signal based on said status data.

7. The system according to claim 1, wherein said first selector unit transfers said initialization data to said second selector unit.

8. The system according to claim 1, further comprising a first local storage medium communicatively coupled to said first processor and a second local storage medium communicatively coupled to said second processor, said first and second local storage mediums receiving and storing said initialization data during said initial power-up procedure.

9. The system according to claim 8, wherein the selection of said initialization data comprises retrieving said initialization data from one of said first and second local storage mediums in response to a signal based on said status data.

10. The system according to claim 1, wherein said one of said first and second processors does not process said status data when said system does not require the use of said processor.

11. The system according to claim 1, wherein at least one of said first and second processors includes a local power-on-reset ("POR") unit that: (i) stores said initialization data therein, and (ii) provides said initialization data to its corresponding processor for at least one of said initial power-up procedure and re-initialization.

12. The system according to claim 1, wherein at least one of said first and second processors includes a local power-on-reset ("POR") unit that stores a POR bit sequence therein, said POR bit sequence switching said at least one of said first and second processors from at least one of an active mode to an inactive mode and an inactive mode to an active mode.

13. A method for performing a multi-processing operation, comprising:

monitoring a processing load of a system by a main processor of said system, and selectively enabling and disabling one or more of a plurality of processors of said system by said main processor;

performing a first operation by a first processor of said plurality of processors, said first processor including a first selector unit communicatively coupled thereto;

performing a second operation by a second processor of said plurality of processors substantially in parallel with said first operation, said second processor including a second selector unit communicatively coupled thereto;

receiving initialization data provided to said first and second processors to carry out an initial power-up procedure;

selecting said initialization data for one of said first and second processors that is switched from at least one of said inactive mode to said active mode and said active mode to said inactive mode, such that the other of said first and second processors need not be re-initialized and remains operative uninterrupted; and storing status data from said main processor, said status data having one of said first and second processors selectively switch from at least one of an active mode to an inactive mode after said initial power-up procedure and an inactive mode to an active mode after said initial power-up procedure, wherein:

said first and second selector units receive said initialization data and decide whether to provide said initialization data to their respective processors for at least one of said initial power-up procedure and re-initialization; and at least one of said first processor and said second processor operates to process said received initialization data for at least one of said initial power-up procedure and said re-initialization when said system requires the use thereof to handle said processing load, and at least one of said first processor and said second processor operates to not process said received initialization data for at least one of said initial power-up procedure and said re-initialization when said system does not require the use thereof to handle said processing load.

14. The method according to claim 13, further comprising turning off power to said one processor to effect said inactive mode, and turning on the power to said one processor to effect said active mode.

15. The method according to claim 13, further comprising disabling a clock signal to said one processor to effect said inactive mode, and enabling said clock signal to said one processor to effect said active mode.

16. A storage medium for storing program code, when executed, causes a plurality of actions to be performed, comprising:

monitoring a processing load of a system by a main processor of said system, and selectively enabling and disabling one or more of a plurality of processors of said system by said main processor;

performing a first operation by a first processor of said plurality of processors, said first processor including a first selector unit communicatively coupled thereto;

performing a second operation by a second processor of said plurality of processors substantially in parallel with said first operation, said second processor including a second selector unit communicatively coupled thereto;

receiving initialization data provided to said first and second processors to carry out an initial power-up procedure;

selecting said initialization data for one of said first and second processors that is switched from at least one of said inactive mode to said active mode and said active mode to said inactive mode, such that the other of said first and second processors need not be re-initialized and remains operative uninterrupted; and storing status data from said main processor, said status data having one of said first and second processors selectively switch from at least one of an active mode to an inactive mode after said initial power-up procedure and an inactive mode to an active mode after said initial power-up procedure, wherein:

said first and second selector units receive said initialization data and decide whether to provide said initialization data to their respective processors for at least one of said initial power-up procedure and re-initialization; and at least one of said first processor and said second processor operates to process said received initialization data for at least one of said initial power-up procedure and said re-initialization when said system requires the use thereof to handle said processing load, and at least one of said first processor and said second processor operates to not process said received initialization data for at least one of said initial power-up procedure and said re-initialization when said system does not require the use thereof to handle said processing load.

* * * * *